United States Patent
Lang et al.

[11] 3,861,489
[45] Jan. 21, 1975

[54] MERCURY SWITCH BRAKING SYSTEM

[75] Inventors: Thomas J. Lang, Torrance, Calif.; Joseph A. Lang, Huntington, N.Y.; Kenneth G. Lang, E. Northport, N.Y.; Robert L. Davis, Lloyd Harbor, N.Y.

[73] Assignee: Lang Davis Industries, Inc., Huntington, N.Y.

[22] Filed: July 5, 1972

[21] Appl. No.: 269,034

[52] U.S. Cl. .................. 180/103, 188/3 R, 303/7, 303/20
[51] Int. Cl. .............................................. B60t 7/20
[58] Field of Search ......................... 180/103–104; 188/112, 181 A, 3 R; 280/112, 432; 303/7, 20, 21 CG, 24

[56] References Cited
UNITED STATES PATENTS

| | | | |
|---|---|---|---|
| 3,288,240 | 11/1966 | Franzel | 180/103 UX |
| 3,398,991 | 8/1968 | Compton | 303/7 |
| 3,566,987 | 3/1971 | Franzel | 180/103 |
| 3,715,003 | 2/1973 | Jubenville | 303/20 X |

*Primary Examiner*—Trygve M. Blix
*Assistant Examiner*—Stephen G. Kunin
*Attorney, Agent, or Firm*—Clarence A. O'Brien; Harvey B. Jacobson

[57] ABSTRACT

A system is disclosed for sensing the lateral acceleration (centrifugal force) on an automobile which is towing a trailer and automatically applying the brakes of the trailer to prevent the lateral acceleration on the trailer from increasing to the point where the automobile would lose operative control of the trailer. The system consists of a pair of mercury switches which are interconnected to the braking system of the trailer. The mercury switches are placed at opposing variable inclined angles so that one switch senses lateral acceleration in the righthand direction and the other senses lateral acceleration in the lefthand direction. An indicating device which is interconnected into the system is located on the dashboard of a vehicle. The device indicates whether the sensing system is sensing lateral acceleration and whether the brakes are being applied.

6 Claims, 12 Drawing Figures

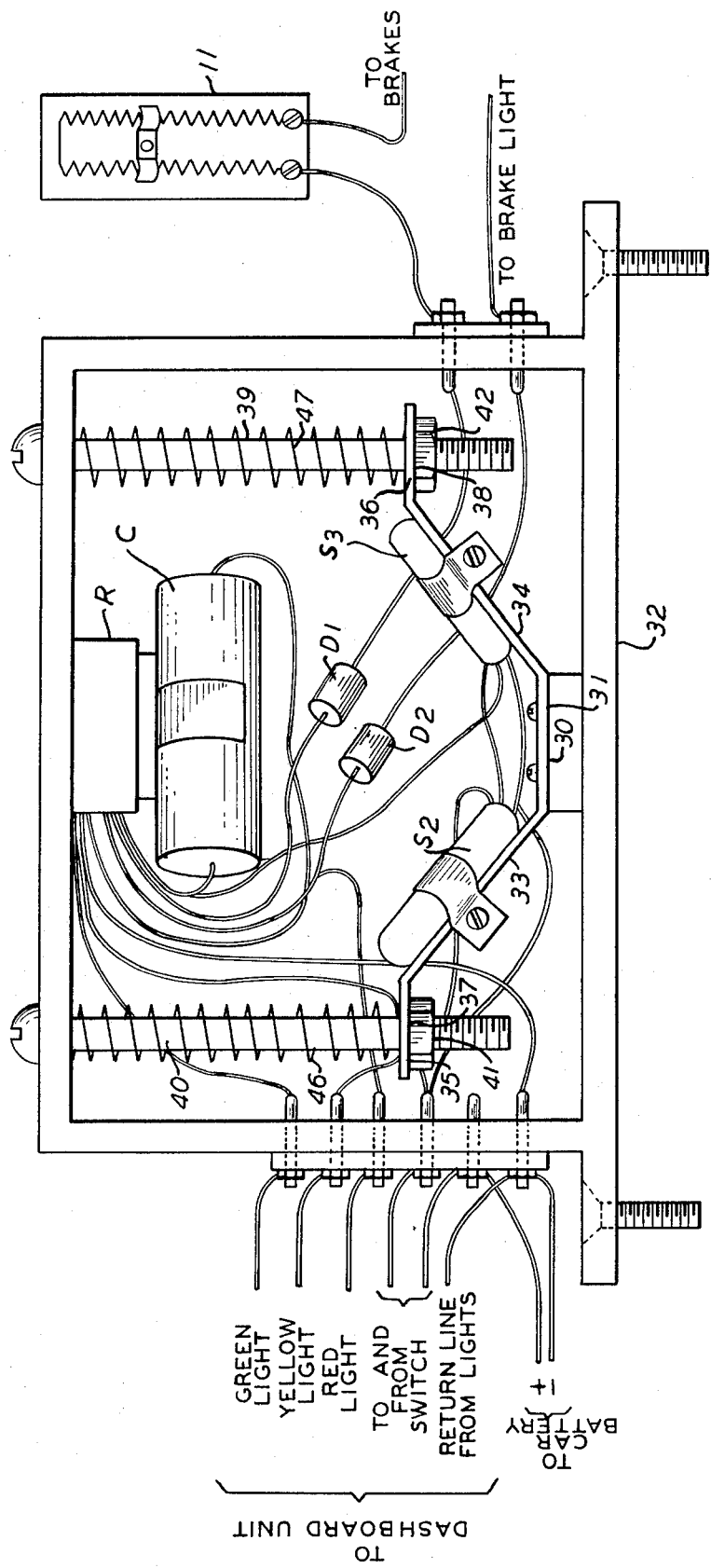

MERCURY SWITCH BRAKING SYSTEM

BACKGROUND OF THE INVENTION

This system basically relates to the towing of one vehicle by another and especially to the towing of a trailer by an automobile. In towing a trailer there is a serious problem, especially when the operator of the automobile is not highly experienced in towing trailers, that is, that the driver will forget that he is towing the trailer and attempt to negotiate curves at the speed at which the automobile could negotiate these curves alone. When this is attempted, if the speed is above a certain level, the automobile will be able to negotiate the curve but the trailer will lose traction on the road due to excessive side force or tilt to the point that it becomes unstable and will either jackknife and hit the automobile and damage both vehicles, cause the automobile to lose control, or tilt over to the point where it crashes into the ground. In either case a highly undesirable result is achieved. To prevent this, manufacturers of trailers have incorporated braking systems into the trailers but these systems are usually under the manual control of the driver and if the driver forgets about braking the trailer separately the system is of no use. It would be highly desirable if a system could be devised that was totally automatic in operation, a system which would actuate the brakes of the trailer if the lateral acceleration of the automobile, in other words, the centrifugal force, exerted on the automobile as it was rounding a turn, was above a certain level. The brakes of the trailer (since the trailer would be undergoing the same lateral force) would automatically be actuated. Then if the trailer is going around a curve and the automobile is going above a predetermined speed the brakes of the trailer would automatically be actuated to slow down both vehicles so that the lateral acceleration forces on the trailer do not increase to the point where the driver of the automobile loses control of the trailer. It would also be desirable if such a system could be devised which uses a quickly and easily operable unit which has essentially no moving parts. It is thus the object of this invention to provide an automatic braking system for trailers which is actuated by lateral acceleration forces applied on the automobile and more particularly, on mercury switches which are located therein.

SUMMARY OF THE INVENTION

An automatic braking system for vehicles which comprises two mercury switches which are adjustably positionable at various predetermined angles to sense the lateral acceleration on the vehicle and automatically operate the braking system of the vehicle or an interconnected vehicle.

BRIEF DESCRIPTION OF THE DRAWINGS

FIG. 4 is a detailed view of the sensing unit;

PREFERRED EMBODIMENT OF THE INVENTION

Figure 1:
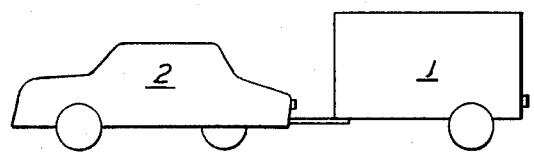
FIG. 1 illustrates an automobile towing a trailer with the system of this invention located in the automobile.
Figure 2:
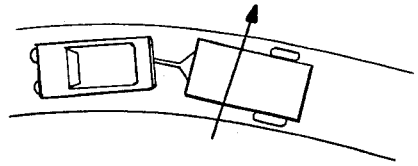
FIG. 2 illustrates the automobile and trailer proceeding around a curve where the sensing system of this invention might be in operation.
Figure 3:
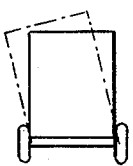
FIG. 3 illustrates the tilting of the trailer which might cause the sensing system to react.
Figure 7:
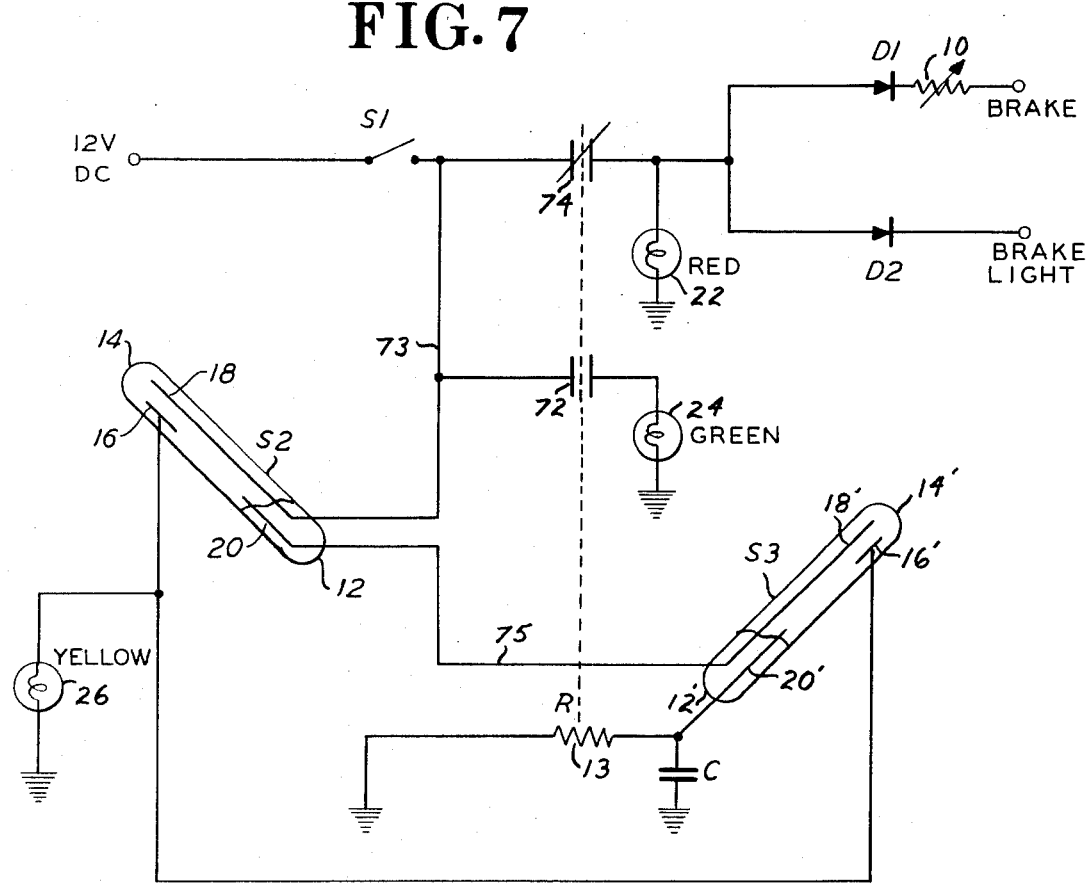
FIG. 7 is a circuit diagram of the sensing unit.

This invention relates to a system for automatically braking vehicles especially vehicles towed by other vehicles such as trailers and automobiles. As shown in FIG. 1, the automobile will be towing the trailer in the normal manner. The problem occurs when the two vehicles are proceeding around a curve (as shown in FIG. 2). If they proceed around a curve at too high a speed the lateral acceleration forces on the trailer such as shown by the arrow in FIG. 2, or in other words, the centrifugal force on the trailer, will cause the trailer to tip over and crash into the ground, to skid out of control, or possibly jackknife and hit the automobile. In any case, the automobile will lose control of the operation of the trailer. This is also illustrated in FIG. 3 which is a front view of the trailer and shows by the dotted lines how the lateral force would cause the trailer to tilt over. The present system is therefore designed to sense this lateral acceleration or force and automatically apply the brakes on the trailer so that the trailer and thereby the automobile is slowed down to reduce the lateral force below the point where it could cause tilting or skidding of the trailer. The operation of this system is centered around two mercury switches $S_2$ and $S_3$, as shown in FIGS. 4 and 7. These switches which are mounted at adjustable predetermined angles with respect to the horizontal are positioned in the vehicle in the container 32 shown in FIG. 6, so that one of the switches $S_3$ will be actuated for righthand lateral forces and one $S_2$ for lefthand forces. The container is positioned so that its long dimension is perpendicular to the direction of movement of the vehicle. The mercury switches are in a plane parallel to this long dimension. Basically, if the lateral acceleration in either direction is greater than an amount set (this is preset by means hereinafter described), the lateral force on the mercury in one of the mercury switches (for example, switch $S_2$ in FIG. 7), will cause the mercury in that switch to be driven up the incline or, for example, from point 12 to point 14 in switch $S_2$ (FIG. 7). When the mercury is driven completely up the incline it will complete the circuit between open contacts 16 and the top part of 18 in the switch. It will also break the circuit between contacts 20 and the lower part of 18 in the switch. At this point, power will be sent to the brakes to cause the trailer to slow down. As the trailer slows down, the automobile will slow down and the lateral acceleration forces on the mercury which had caused it to move up the incline in the tube will be lessened to the point where the mercury will begin to fall to the bottom of the tube. Once it has fallen a sufficient amount the mercury will again cover contacts 20 and the lower portion of 18, and the brakes will cease to be applied. Eventually the mercury will fall to the normal position at the bottom of the tube. This normal position is the position in which the sensing unit senses either no lateral acceleration or lateral acceleration below the limit which will cause the mercury to break contacts 18 and 20 and actuate the sensing system. FIG. 4 shows the mounting of the mercury switches in the casing which holds them. The mercury switches which are shown as glass enclosed cylinders having globules of mercury therein are supported on a wing-shaped bracket 30. This bracket consists of a central portion 31 which is securely bolted to the inside of the overall container (32) which holds the sensing unit. Each of the wings include a 35° angle section 33 and 34 and a flat end section 35 and 36. Each of the 35° angle sections has one of the mercury switches positioned on it. It will appreciated that these 35° angles are variable as discussed hereinafter. The top flat portion of each of the wings has a hole 37, 38 therein; a long bolt 39, 40 is placed through this hole and secured by means of a nut 41, 42. The latter being positioned below the flat section of the bracket and threaded on the bolt. Between the top of each of these flat sections and the top of the container which holds the sensing unit, springs 46, 47 are positioned. The springs which are concentrically positioned around the bolt bias the flat section of the bracket downwardly in FIG. 4 to hold the bracket and thereby the mercury switches in position. Being that there are two of these spring bolt combinations, each end of the support for the mercury switches is held securely in position. However, when it is desired to change the angular position of either mercury switch its respective bolt can be screwed down to raise the angle of the mercury switch or loosened to lower the position of the nut and decrease the angle of the mercury switch. This adjustment is very important since this will determine the incline of each mercury switch and thus the amount of lateral force needed to drive the mercury up the incline and actuate the braking system. The greater the incline the greater the amount of lateral force needed and thereby the greater the lateral force neeed to cause the mercury to be pushed up the incline. Thus, this simple adjustment feature provides for quick and accurate adjustment of the amount of force needed for actuation of the mercury switches. The bolts are arranged so that a simple screwdriver can be used for this adjustment. For example, an adjustment so that the angle of the mercury switch is only 5° from the horizontal will cause the switch to trip for a very slow turn while a setting of 40° from the horizontal requires a sharp tight turn for the switch to trip or in other words, for the mercury to be driven up the incline.

Figure 9:
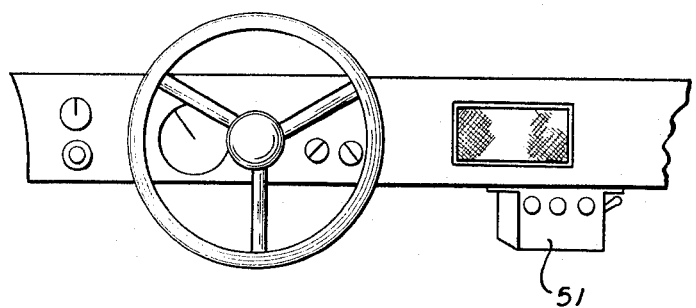
FIG. 9 is a view of the indicating unit in position on the dashboard of a vehicle.
Figure 8:
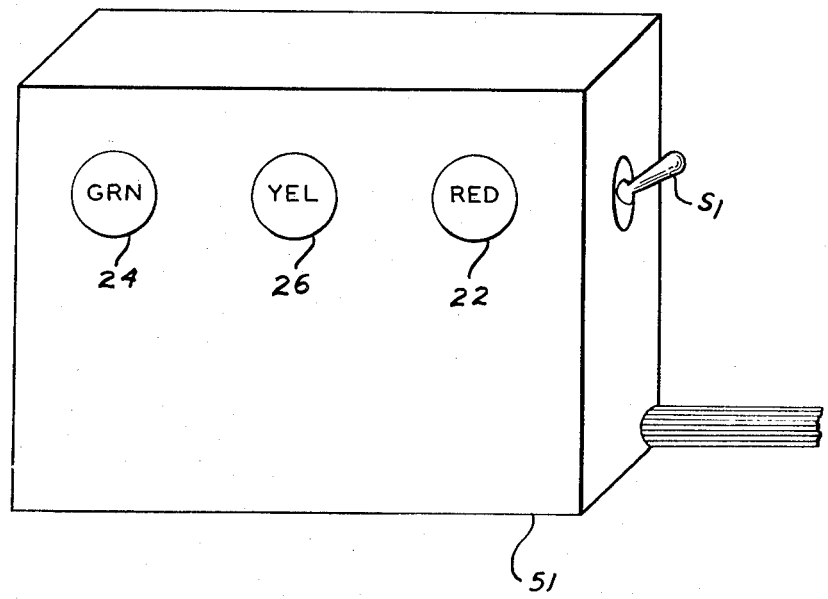
FIG. 8 is a view of the exterior of the indicating unit.

Now referring to the other part of the sensing system, that is, the dashboard light indicator. This consists of a unit 51 such as shown in FIGS. 8 and 9. The unit is mounted in the automobile within view of the driver, such as under the dashboard, on the steering post, or about the dashboard of the automobile. This unit includes an on-off switch and three lights — red 22, green 24 and yellow 26. The switch 51 which turns off the entire system including the sensing unit is positioned within easy access of the driver's reach. Thus, if it is desired to disconnect the system, the switch is simply tripped. In normal operation when the system is on, the green light will be on, however, when the amount of lateral acceleration present is sufficient to cause movement of the mercury in a switch to join contacts 16 and the upper part of 18 in FIG. 7 while still covering contacts 20 and the lower part of 18 this will cause the yellow light to go on. When the acceleration increases beyond this point the contact between 20 and 18 is finally broken and the red light will go on (the yellow light will stay on) and the brakes will now be applied. This entire unit is connected by a cable to the sensing unit as hereinafter described.

Now describing the circuitry of the sensing unit in more detail. The circuitry, as shown schematically in FIG. 7, includes the two mercury switches S2 and S3 which have two sets of contacts, a lower set contact 20 and the lower part of contact 18, and an upper set contact 16 and the upper part of contact 18 for switch S2, and for switch S3 a lower set contact 20' and the lower part of contact 18' and an upper set 16' and the upper part of contact 18'. The mercury is normally positioned by the forces of gravity at the lower portions 12 and 12' of each of the switches (in this manner it closes contacts 20 and 18 in switch S2 and 20' and 18' in switch S3). A normally energized relay R, 13, is connected from contact 20' to ground and a capacitor C is also connected in parallel with the relay from contact 20' to ground. The upper contact 16 and 16' of the switches are also connected together and connected to the yellow light 26. Contact 18 of S2 is connected through normally opened contact 72 to green light 24 and through normally closed contact 74 to red light 22 and through D1 and a resistor to the brakes of the trailer and through D2 to the brake lights. In normal operation when switch S1 is closed (this switch actuates the entire system of this invention) and current is applied from the source through S1 through line 73 and through open contact 72 to the green light (the open contact is held closed by relay R) and also to apply current to contacts 18 and 20 in switch S2 through that switch and through line 75 to switch S3. In switch S3 the current travels across contacts 18' and 20' and travels to the relay 13 and capacitor C. The relay, since it is normally energized, keeps contact 72 closed and keeps normally closed contact 74 open. When switch S2 is actuated by a small amount of lateral acceleration the mercury will initially move up the tube so that it covers both contacts 20 and 18 and 16 and 18. In this position the yellow light will be lit because of the connection between contact 16 and the yellow light. However, the green light will also remain lit because the mercury will still cover contacts 20 and 18, this will keep the relay on and keep contact 74 open. Because contact 74 is open the brakes and the brake lights will not be actuated. When the lateral acceleration increases above the previous point the mercury will move still further up the tube so that it breaks the connection between contacts 18 and 20. Now only contacts 16 and 18 will be closed. The yellow light will continue to remain on but the relay will no longer receive any current. The relay will then not be able to keep normally opened contact 72 closed and the green light will go off. The relay will also not be able to keep normally closed contacts 74 open and the contact will then close and cause both red light 22 to become lit and current to pass through D1 to actuate the brakes of the trailer and to pass through D2 to actuate the brake lights of the car. This in turn will actuate the brake lights of the trailer because of the interconnection between the brake lights of the trailer and those of the car. A capacitor C is positioned to introduced a slight delay in the de-energizing of the relay and the application of the braking power to prevent bumps and jars from activating the system. It provides for smooth actuation of the brakes when they are actually needed. In other words, if the car accidentally went over a bump and caused the mercury to move up the incline it could not stay there a sufficient length of time needed by the capacitor to cause actuation of the system. Two diodes in the system, one in the output line to the brakes and the other one in the output line to the brake lights are used to prevent feedback current from other systems from affecting the operation of this circuit. If there is a manual brake which is used to actuate the trailer brakes, for example, this diode prevents the feedback from that brake from affecting the components of this invention. There also may be a buzzer positioned in parallel with the red light on the dashboard so that the actuation of the red light will also actuate that buzzer. The individual red, yellow and green lights may be 6 or 12 volts depending on the voltage used.

Figure 5:
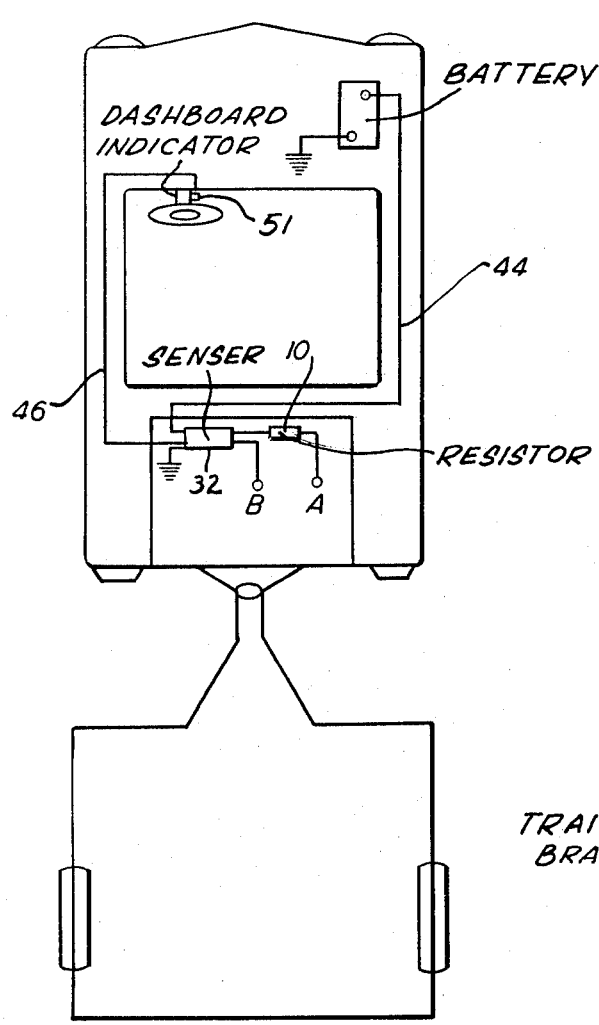
FIG. 5 is a view of the present system in a vehicle

Normally, and as shown in FIG. 5, the battery of the automobile is interconnected to the sensing unit 32 (by means of line 44) and the sensing unit is connected to the indicator dashboard, 51 (by means of line 46). The sensing unit is then connected to the braking system of the trailer as will be discussed in more detail hereinafter.

Figure 5A:
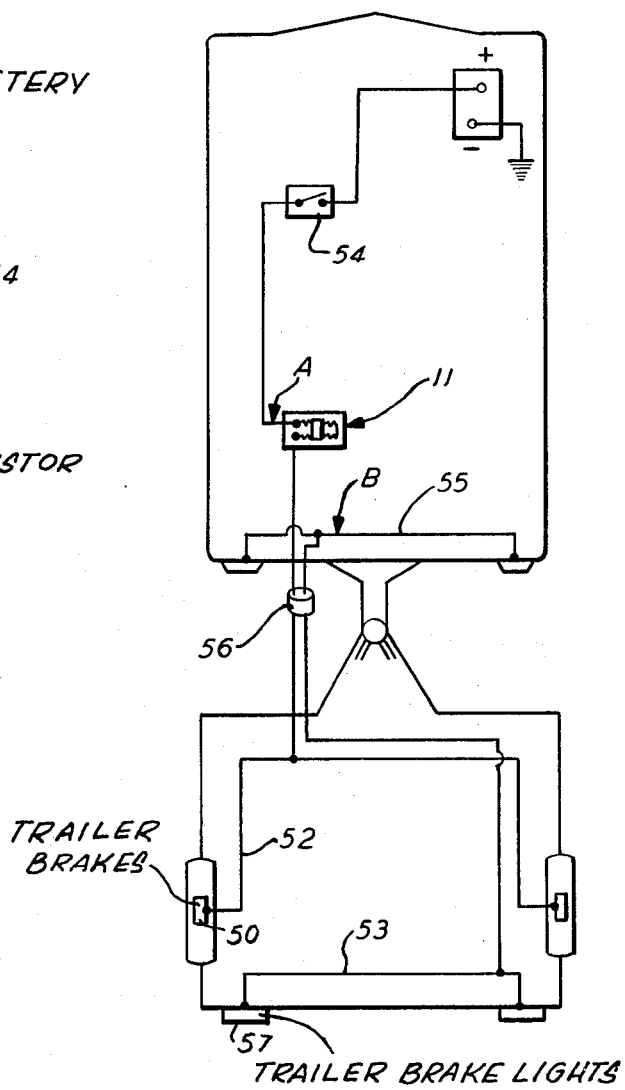
FIG. 5A is a view of the electrical system of an automobile and the braking system of a trailer showing where the present system would be interconnected.

As briefly mentioned before, trailers with electric brakes generally utilize a manual braking switch 54 as shown in FIG. 5A. This braking unit may, for example, be positioned alongside the braking pedal of the automobile and is interconnected to the battery, and can be used independently of the sensing system to manually apply the brakes on the trailer. There is also generally a potentiometer 11 in the normal trailer braking circuit, which is used to control the amount of voltage applied to the electric brakes and is connected to the braking switch 54. This is adjustable depending on the weight of the trailer. As shown in FIG. 5 the output line from the sensor 32 of this invention is interconnected to the normal trailer braking circuit by connecting point A in FIG. 5 to point A in FIG. 5A. Unit 10 which as shown in FIG. 5 is between sensor 32 and point A is a resistor and will be discussed in more detail hereinafter. The aforementioned connection will interconnect the present invention to the normal trailer circuitry. The normal circuitry of the trailer as shown in FIG. 5A consists of brakeline 52 connected to brakes 50 and brake light line 53 connected to the car brake lights 55. Lines 53 and 52 connect to the automobile electrical system by means of coupling 56. More specifically line 52 will connect to brake switch 54 and line 53 will connect to line 55 by means of the coupling. By interconnecting the present system as aforementioned the trailer can be stopped automatically if the lateral acceleration exceeds a predetermined value. It can also be stopped by manual brakes as mentioned previously. The trailer brake lights 57 are connected to the automobile brake light system as aforementioned and the car brake light system is actuated upon the operation of the present system as described with respect to FIG. 7. Specifically, brake light output line B in FIG. 5 is connected to the car brake light line 55 at point B as shown in FIG. 5A. By connecting points B and B in FIGS. 5 and 5A the present system is connected to the automobile brake light system. If it is desired to have the automatic braking weaker than the manual braking, a second variable resistor shown as 10 in FIG. 5 may be added in the brake output line from the invention. This will reduce the power to the brakes through the present invention.

Figure 10:
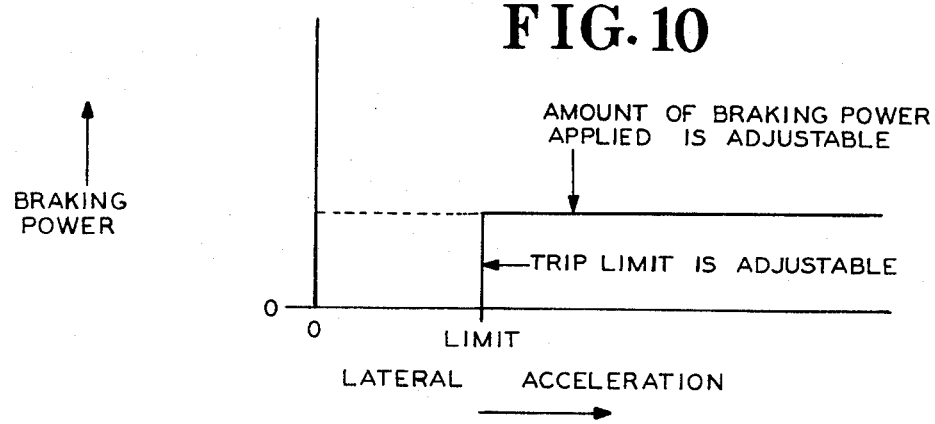
FIG. 10 is a graph of braking power versus lateral acceleration.
Figure 11:
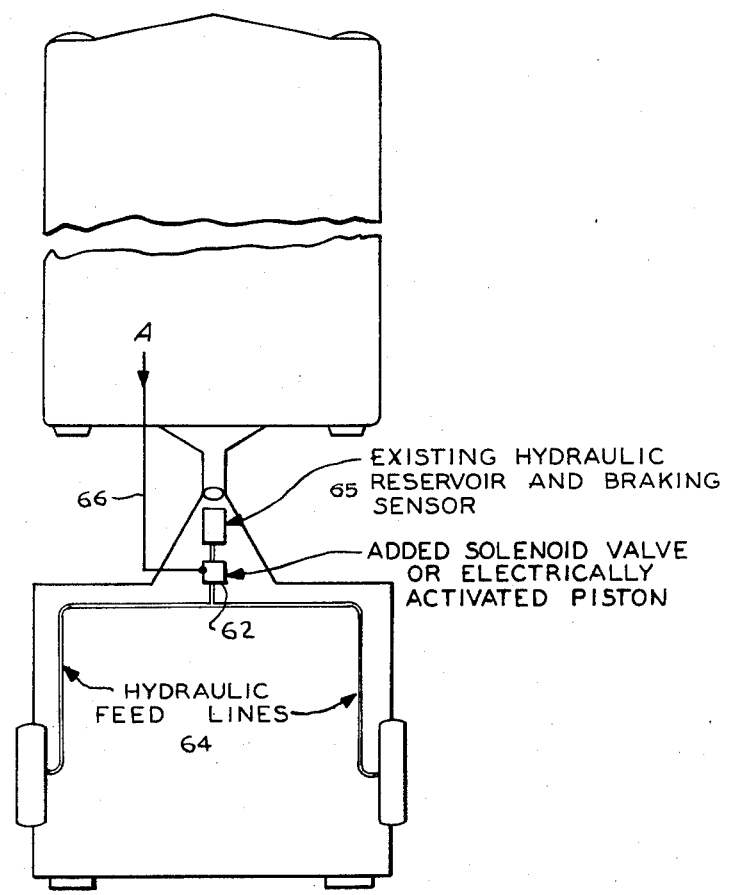
FIG. 11 is a view of the present system with a trailer having hydraulic brakes.

As explained above, the present automatic system may be easily connected to the trailer braking system directly if the trailer has electrical brakes. The sensor unit is positioned in the trunk of the automobile FIG. 6 and connected to the battery of the car FIG. 5, the brake lights of the car and the brakes of the trailer. The indicating light system is connected to this system as shown in FIG. 5 by lines leading thereto. If the trailer has hydraulic brakes (FIG. 11) instead of electrical brakes, a solenoid operated valve or electrically operated piston 62 would be inserted into the hydraulic brake line 64 of the trailer. This line leads from the existing hydraulic reservoir and braking sensor 65 through the hydraulic feedlines of the trailer which actuate its brakes. The brake output line 66 from this invention, point A in FIG. 5 would be connected to the added solenoid valve. Now activation of the sensing system will cause the solenoid to pressurize the hydraulic fluid lines of the trailer thus applying the trailer brakes. FIG. 10 is a graph of braking power on the Y axis versus lateral acceleration on the X axis. From this it will be seen that the braking power is zero until the lateral acceleration hits a predetermined point (the limit). When it hits that point the braking power is applied and stays at a level until the lateral acceleration decreases.

The circuit design can also be altered to provide several different levels or strengths of braking power. Light braking could be provided if the vehicle lateral acceleration just exceeded the preset limit and progressively stronger braking if acceleration continued and exceeded further limits. This could be accomplished by replacing the yellow warning light in the present circuit by a second relay and capacitor combination and using the normally open contact of the relay to apply power through another potentiometer to the brakes and brake lights. This can be described in more detail with reference to FIG. 7: a lateral acceleration causing the mercury to connect contacts 16 and 18 would then yield light braking. If lateral acceleration were to increase still further causing the mercury to break contacts 18 and 20, a stronger braking would be applied. Also, more than two step values of braking power could be obtained by adding more mercury switches to the existing mercury switch. These added units would be slightly inclined to the present units so that they would trip at slightly higher lateral accelerations. In this manner any number of step values of braking could be provided. The system shown in the circuit diagram can be used for 12-volt negative ground automobile systems. 6-volt battery systems can be accepted by merely replacing the 12-volt relay, and positive ground battery systems, and can be accepted by reversing the polarity of the diodes. It will, of course, be appreciated that this is but one of many circuits that will be applicable to the present invention.

Figure 6:
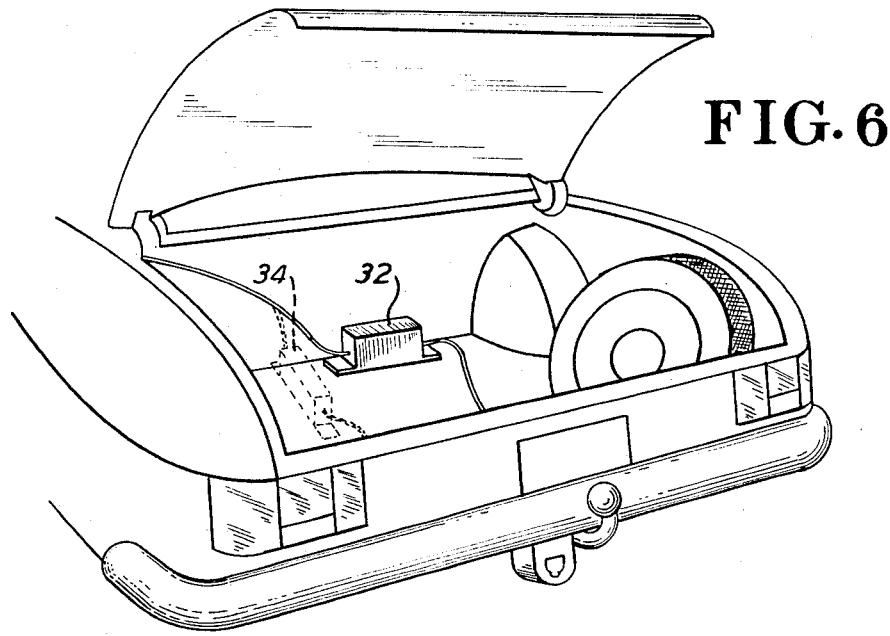
FIG. 6 is a view of the sensing unit in the trunk of an automobile.

It will also be noted that the present system can be useful to determine mere tipping of a vehicle. In other words, if a vehicle was parked on an incline and accidently tipped too much it could set off a warning buzzer. Also, this same idea can be used as a burglar alarm. Any tilting of a device or shaking of a device would set off the alarm. This can be used to determined if a vehicle is being broken into. Also, the unit can be adjusted so the owner of the vehicle after parking it on an incline can adjust the switch so that any further tilting of the vehicle in either direction would actuate the system which could then actuate an alarm. Also, if desired, the alarm could continue ringing after the vehicle is righted by simply putting a magnetic latching relay in place of the normal relay and this will continue to actuate the alarm even after the vehicle is righted. Also, sensors can be mounted such that the plane of the sensors is in the longitudinal direction, that is, in the direction of vehicle motion (the container in FIG. 6 will be turned 90°), an effective acceleration-deceleration indicator or switch can be obtained. The dotted lines in FIG. 6 show the new orientation of the sensing unit 34 in the vehicle. In this position the mercury switches are mounted pointing forward and aft. With the forward switch adjusted to trip only on the strongest braking that can be provided on the car, a braking capability tester is obtained. When full braking on dry level pavement no longer actuates the switch, tires and brakes are not operating correctly. Also, the aft switch can be adjusted to indicate acceleration ability of the car. When full throttle no longer activates the switch some engine power has been lost. Also, it could be used as a gas mileage increaser. Light application of the accelerator would not actuate the mercury switches. However, hard acceleration would. Therefore, if the mercury switches were set to a predetermined level and a harder force that that level was applied it would actuate a light, indicating to the driver that he was driving incorrectly.

It will thus be appreciated tha a simple, efficient vehicle-motion sensor has been developed, a sensor which is particularly effective in sensing lateral acceleration of an automobile towing a trailer and actuating the brakes of the trailer to prevent further acceleration causing damage to the trailer and car.

While various embodiments of the invention have been described it will be appreciated that the invention is not limited thereto since any modifications or changes that come within the scope of the invention are intended to be covered thereby.

What is claimed is:

1. An automatic stability control system for a vehicle to prevent swerving and swaying of said vehicle, said system comprising means for sensing lateral acceleration forces acting upon said vehicle to provide electrical acceleration signals representative of said forces, and brake means associated with said vehicle and responsive to said acceleration signals to actuate said brake means to prevent swaying and swerving of said vehicle, said sensing means including sensitivity adjustment means for setting the minimum magnitude of lateral acceleration force to which said sensing means responds to provide said acceleration signals, said sensing means including a pair of inclined mercury switch assemblies oriented to sense left and right lateral acceleration, said adjustment means including manually actuated means to vary the angle of inclination of the mercury switch assemblies, said switch assemblies including means indicating lateral acceleration approaching an unstable condition prior to the actuation of the brake means, each of said mercury switch assemblies including a pair of longitudinally spaced contacts in a container oriented in inclined position, a third contact extending longitudinally in the container in spaced relation to the pair of contacts, a quantity of conductive mercury in the container normally closing a circuit between the third contact and the lowest of the pair of contacts, said quantity of mercury being movable by lateral acceleration initially into a position for closing a circuit between the third contact and both of the pair of contacts to provide means for indicating lateral acceleration approaching an unstable condition and subsequently to a position closing a circuit between the third contact and the second contact of the pair of contacts located at the upper end of the container for applying the brake means when the lateral acceleration reaches an unstable condition thereby providing a precautionary warning of an approach to an unstable condition.

2. The structure as defined in claim 1 wherein said sensing means includes a housing mounted stationarily with respect to the vehicle, said mercury switch assemblies being disposed in said housing, inclined brackets in said housing supporting the mercury switch assemblies thereon, said adjustment means including screw-threaded members extending externally of the housing and being connected to the respective brackets for varying the angle of inclination of the brackets, spring means associated with each screw-threaded member for maintaining the bracket biased to its adjusted position.

3. The structure as defined in claim 1 including means delaying actuation of the brake means in response to intermittent acceleration signals caused by uneven roadways over which the vehicle travels thereby actuating the brake means only in response to lateral acceleration causing an unstable condition.

4. The structure as defined in claim 1 wherein said sensing means includes a housing mounted stationarily with respect to the vehicle, said mercury switch assemblies being disposed in said housing, inclined brackets in said housing supporting the mercury switch assemblies thereon, said adjustment means including screw-threaded members extending externally of the housing and being connected to the respective brackets for varying the angle of inclination of the brackets, spring means associated with each screw-threaded member for maintaining the bracket biased to its adjusted position, means delaying actuation of the brake means in response to intermittent acceleration signals caused by uneven roadways over which the vehicle travels thereby actuating the brake means only in response to lateral acceleration causing an unstable condition.

5. The structure as defined in claim 4 together with indicating light means energized by the mercury switch means to indicate a stable operating condition for the vehicle, and a warning light means operated when the brake means are actuated to indicate an unstable condition caused by lateral acceleration.

6. The structure as defined in claim 5 wherein said stable condition indicating light means is energized by said mercury switch means when the mercury therein is in normal condition closing a circuit between the lower contact of the pair of spaced contacts and the longitudinally elongated contact.

* * * * *